United States Patent [19]

Allen

[11] Patent Number: 4,770,265
[45] Date of Patent: Sep. 13, 1988

[54] FOUR WHEEL STEERING FOR NON-ARTICULATED VEHICLES

[76] Inventor: Dillis V. Allen, 240 Lincolnshire Ct., Schaumburg, Ill. 60193

[21] Appl. No.: 36,266

[22] Filed: Apr. 9, 1987

[51] Int. Cl.$^4$ .............................................. B62D 5/06
[52] U.S. Cl. .................................. 180/140; 180/142; 364/424.01
[58] Field of Search .................. 180/140, 141, 142; 280/91; 364/424

[56] References Cited

U.S. PATENT DOCUMENTS

| | | | |
|---|---|---|---|
| 4,373,603 | 2/1983 | Nelson | 180/140 |
| 4,441,572 | 4/1984 | Ito et al. | 180/140 |
| 4,446,941 | 5/1984 | Laurich-Trost | 180/140 X |
| 4,467,885 | 8/1984 | Furukawa | 280/91 X |
| 4,552,239 | 11/1985 | Kanazawa | 180/141 X |
| 4,558,877 | 12/1985 | Furukawa et al. | 280/91 |
| 4,566,710 | 1/1986 | Furukawa et al. | 180/140 X |
| 4,598,788 | 7/1986 | Serizawa et al. | 180/140 |
| 4,601,357 | 7/1986 | Miyoshi et al. | 180/140 |
| 4,621,702 | 11/1986 | Kanazawa et al. | 180/140 |
| 4,625,822 | 12/1986 | Nakamura et al. | 180/140 |
| 4,645,025 | 2/1987 | Ohe et al. | 180/140 |
| 4,657,102 | 4/1987 | Kanazawa et al. | 180/140 |
| 4,706,978 | 11/1987 | Ito | 280/91 |

FOREIGN PATENT DOCUMENTS 60-146759  8/1985  Japan .................................. 180/140

Primary Examiner—John A. Pekar

[57] ABSTRACT

A four wheel steering system for non-articulated vehicles including a digital angle register for periodically generating front wheel angle information $\theta_{F1}, \theta_{F2} \ldots \theta_{FN}$ representing the incremental angular positions of the front wheels and a rear wheel angle generator for storing the information and utilizing it after a delay distance D to control the angular positions $\theta_{R1}, \theta_{R2} \ldots \theta_{RN}$ of the rear wheels.

38 Claims, 7 Drawing Sheets

| d | $\theta_F$ | $\theta_R$ |
|---|---|---|
| 0 | 4°R | 0 |
| 1 | 8°R | 0 |
| 2 | 12°R | 4°L |
| 3 | 16°R | 8°L |
| 4 | 20°R | 12°L |
| 5 | 16°R | 16°L |
| 6 | 12°R | 12°L |
| 7 | 8°R | 8°L |
| 8 | 4°R | 4°L |
| 9 | 0 | 0 |
| 10 | 4°L | 0 |
| 11 | 8°R | 0 |
| 12 | 12°R | 4°R |
| 13 | 16°R | 8°R |

| $d_2$ | $\theta_F$ | $\theta_R$ |
|---|---|---|
| 0 | 4°R | 0 |
| 1 | 8°R | 0 |
| 2 | 12°R | 0 |
| 3 | 16°R | 0 |
| 4 | 20°R | 4°L |
| 5 | 16°R | 8°L |
| 6 | 12°R | 12°L |
| 7 | 8°R | 8°L |
| 8 | 4°R | 4°L |
| 9 | 0 | 0 |
| 10 | 4°L | 0 |
| 11 | 8°R | 0 |
| 12 | 12°R | 0 |
| 13 | 16°R | 0 |

FOUR WHEEL STEERING FOR NON-ARTICULATED VEHICLES

BACKGROUND OF THE INVENTION

Four wheel steering has in the last few years gained some modicum of commercial success in passenger vehicles, and it appears that by the early 1990s four wheel steering systems will be utilized in most performance-type passenger vehicles and later in the decade in almost all passenger vehicles, and all this projected four wheel steering expansion is due to the improved handling characteristics of four wheel steering.

The fundamental advantage in four wheel steering is that for a given angular movement of the front wheels, a given vehicle speed, and a given distance traveled, the longitudinal axis of the vehicle will turn through a far greater angle with four wheel steering than with two wheel steering. This is because the rear wheels in a turn in four wheel steering tend to track for outside the turn path of the front wheels, swinging the rear end of the vehicle markedly outside during a turning maneuver.

For purposes of discussion further in this description, the central longitudinal axis of the vehicle is referred to as a reference axis, and the angles through which the front wheels are turned during any turning movement with respect to this reference axis are incrementally $\theta_{F1}$, $\theta_{F2}$—$\theta_{FN}$, and the incremental angles through which the rear wheels are turned with respect to the same reference axis are turned $\theta_{R1}$, $\theta_{R2}$—$\theta_{RN}$. Ideally, and for maximum steering response, $\theta_R$ will always equal $\theta_F$, that is, the angular position of the rear wheels should always be equal to the angular position of the front wheels, on the opposite side of the reference axis so that when the front wheels turn to the right the left wheels turn to the left. This steering action is achieved when the front wheel steering arms are mechanically or hydraulically connected to move the rear wheel arms in a one to one ratio.

However, there are several reasons why this ideal four wheel steering system is not commercially feasible. The first is the response to steering in a one to one four wheel steering system is so great that the average driver would have difficulty controlling the very rapid steering and would tend to over-steer the vehicle. This is the primary reason why four wheel drive technology which, in its basic form, has not as yet been significantly applied commercially to passenger vehicle where drivers have only average driving ability. Automobile manufacturers have been reticent to adopt four wheel steering systems because of the large cost required to educate the public to a more responsive steering system.

The second reason for the historical delay in commercially implementing four wheel steering is the tendency of known four wheel steering systems to throw the rear end of the vehicle outside the path of travel of the front wheels during the initial portion of a turning maneuver. At slow speeds this inherent action in known four wheel steerings can cause the rear end of the vehicle to move outwardly a sufficient distance so that it may impact against an object that the front end of the vehicle easily passes, and at high speeds this inherent characteristic can cause the vehicle to go into a spin with a sufficiently abrupt maneuver.

For these reasons there have been many attempts over the last decade to modify the response to the rear wheel steering mechanism so that it is somewhat less responsive than the front wheels to mnimize the rear throw-out characteristic of four wheel steering and to reduce the steering response so that it is more palatable to the average driver.

One of these known response modifying systems has been developed by the Nissan Motor Corporation of Japan, and this system utilizes a control that receives angle information relating to the angular position of the manual steering wheel and applies a first formula to calculate the front wheel angles $\theta_F$ and a second formula to calculate the rear wheel angles $\theta_R$, with the front wheel angles being inversely proportional to vehicle speed, and the rear wheel angles $\theta_R$ being proportional to the front wheel angles divided by vehicle speed. Thus, the rear wheel angles $\theta_R$ are inversely proportional to vehicle velocity squared $V^2$ rendering them extremely speed responsive. That is, at low speed this system would create a somewhat responsive four wheel steering system, but at higher speeds would create a very unresponsive system since its responsiveness decreases with the square of the vehicle speed. In any event, the Nissan algorithm for computing rear wheel angle information is constant for a given velocity, and thus operates in the same manner throughout any single turning maneuver for a given vehicle speed.

The problem with the prior Nissan system, as well as most other systems of which applicant is aware, is that they achieve response control merely by suppressing the rear wheel angles $\theta_{R1}$, $\theta_{F2}$—$\theta_{FN}$ by a fixed constant throughout the turning maneuver so long as the variable conditions remain fixed for that turn, i.e., the variable conditions may be vehicle velocity, angular acceleration, surface conditions, etc. This prior approach is a painkiller without a cure.

There have been other recent attempts to provide microprocessors for controlling front wheel angle $\theta_F$ and rear wheel angle $\theta_R$ including a prototype system displayed by General Motors Corporation at the 1987 Automobile Show at McCormick Place in Chicago, Ill., U.S.A. While all details of this system are not publicly available, the system appears to involve algorithmic rear wheel $\theta_R$ suppression with the degree of suppression constant so long as external conditions remain constant.

Most of these prior four wheel steering systems have been the subject of patent applications and resulting issued patents, and there have been a plurality of other systems that are the subject of patent applications and resulting issued patents that have not as yet been commercialized, although applicant is not completely certain which of the following patents fall into that latter category.

The J. I. Case Co. U.S. Pat. No. 4,373,603 shows a four wheel steering system typical of American technology relating to four wheel steering systems particularly designed for construction or agricultural equipment but not really suited to passenger vehicles. In this system three modes of steering are provided, the first being front wheel only, the second being four wheel steering with opposite front and rear direction control, and a third referred to colloquially as "crab" steering where the front and rear wheels turn in the same direction for lateral movement of the longitudinal axis of the vehicle. The three modes are selected manually and there is no sophisticated control system that interrelates these three modes.

The Honda Kaisha U.S. Pat. No. 4,412,594 illustrates an independently computer controlled system for varying rear wheel steering ratio relative to front wheel steering ratio utilizing two steering modes, the first a low speed four wheel conventional mode and a high speed low sensitivity "crab" mode where rear wheel steering ratio suppression is achieved in response to among other factors the angular velocity of the vehicle itself.

Nissan Motor Company has issued U.S. Pat. Nos. 4,418,780 and 4,441,572 that disclose independently controlled front and rear wheel steering that includes a similar two mode high speed crab system where rear wheel steering ratio suppression is responsive to vehicle yawing rate, vehicle spring mass and velocity.

Laurich-Trost U.S. Pat. No. 4,446,941 shows a two mode four wheel steering system in which the first mode includes a mechnical interconnection between the front steering mechanism and the rear, and a second mode includes an electronic rear wheel steering control.

The Honda Kaisha U.S. Pat. No. 4,467,885 shows a four wheel steering system in which there is a mechanical interconnection between the steering system in the front and the steering in the rear with an amplifier-reducer mechanical system for changing the steering ratio of the front vis-a-vis the rear.

The Mazda Motor Corporation U.S. Pat. No. 4,552,239 shows an all mechanical front wheel and rear wheel steering control system in which the rear wheel steering ratio increases with respect to the front ratio in a low speed range and remains substantially constant with changes in the front wheel steering ratio in a high speed range.

The Honda Kaisha U.S. Pat. No. 4,558,877 discloses a spring biased cam arrangement for controlling the steering torque applied to the rear wheels in a four wheel steering system.

The Honda Kaisha U.S. Pat. No. 4,566,710 shows a system similar to the above described Honda system in U.S. Pat. No. 4,467,885 but includes a control wherein the rear wheel ratio changes are effected only when the vehicle is travelling in a straight ahead direction.

The Honda Kaisha U.S. Pat. No. 4,597,462 shows an independently controlled rear wheel steering system for four wheel steering in which the rear wheel steering ratio is modified in accordance with side winds applied to the vehicle.

The Honda Kaisha U.S. Pat. No. 4,598,788 discloses a four wheel steering system in which the steering ratio of the rear wheels is controlled in accordance with wheel cushioning of the various axles.

The Mazda Motor Corporation U.S. Pat. No. 4,601,357 shows a four wheel system similar to the Honda U.S. Pat. No. 4,566,710 system, but here rear wheel steering ratio control is inhibited during a turning maneuver.

The Mazda Motor Corporation U.S. Pat. No. 4,621,702 discloses an all mechanical steering system for four wheel steering that includes a differential positioned between the front and rear wheel steering systems for varying the steering ratio of the rear wheels.

The Nissan Motor Company U.S. Pat. No. 4,625,822 discloses a four wheel steering system for a non-articulated vehicle with a high speed crab control mode where the rear wheel angles are increased slowly to a target value at the initiation of a turn to prevent the rear end of the vehicle from swinging laterally outwardly.

The Kiki Company U.S. Pat. No. 4,645,025 discloses a computer controlled system for the rear wheel steering mechanism in a four wheel steering vehicle where a memory permanently stores a program of rear wheel angle information which is picked off in response to the angles of the vehicle as they turn.

It is a primary object of the present invention to ameliorate the problems described above in four wheel steering systems for non-articulated vehicles.

SUMMARY OF THE PRESENT INVENTION

In accordance with the present invention, a four wheel steering system is provided for non-articulated vehicles where the response of the rear wheel turning varies in segments of each turning maneuver to provide improved control while maintaining a higher overall response than is possible with present rear wheel angle suppression systems.

This is achieved in part by delaying the initiation of the turning movement of the rear wheels, i.e., delaying the pivotal movement of the rear wheels so that the angle of the rear wheels $\theta_R$ with respect to the longitudinal axis of the vehicle remains zero for a normally fixed distance of travel D of the vehicle. At low speeds this distance is in the range of 0.80 to 0.90 Wb, the symbol for vehicle wheelbase. By distance delaying the turning movement of the rear wheels as the front wheels initiate a turn, the rear wheels initially begin tracking inside the front wheels. At the end of the delay distance D because the rear wheels have tracked inside the path of the front wheels, the rear wheel angles $\theta_R$ increase rapidly during a second segment of the turn tracking outside the path of the front wheels producing a strong vehicular turning movement. This strong turning movement of the vehicle is possible because the rear wheels begin their turning movement from a point radially inside the path of the front wheels.

As the angle of the rear wheels during this second segment of the turning maneuver approaches the angle $\theta_F$ of the front wheels, the vehicle enters a third and final segment of the turn during which the rear wheel angle $\theta_R$ is maintained equal to and in time phase with the front wheel angle $\theta_F$. This prevents the ascending $\theta_R$ rear angles from overtaking the decreasing $\theta_F$ angles as the vehicle is coming out of the turn. If the $\theta_R$ angles were permitted to increase above the decreasing $\theta_F$ angles (or above some predetermined percentage of the $\theta_F$ angles), the outward movement of the rear end of the vehicle during this final portion of the turn would actually inhibit the vehicle from coming out of the turn and tend to keep it in a turning mode configuration. The third turning segment control, which in essence time phases the rear wheels with the front wheel, even though they might be suppressed by some constant value, prevents this steering characteristic when coming out of a turn.

The present steering system proceeds through this three segment turning program for each turn of the vehicle, where a turn is defined according to the present invention as a movement of the steering mechanism from a neutral position aligned with the longitudinal axis of the vehicle in either a clockwise or counter-clockwise direction until it returns to that neutral position without crossing over it. As soon as the steering wheel crosses over neutral from clockwise to counter-clockwise or from counterclockwise to clockwise, a new turn is initiated and the same three segment turning program begins again.

As noted above, in a vehicle with one to one $\theta_F$ and $\theta_R$ phasing and steering ratio, or for that matter any system where the rear angles $\theta_R$ are some fixed percentage with constant variables of the front wheel angles $\theta_F$, the rear of the vehicle will move outside the prior incremental longitudinal axis of the vehicle, immediately upon initiation of the turn. This not only creates vehicle instability, but also positions the rear of the vehicle where it might impact a laterally adjacent automobile or obstruction. By delaying the initiation of turning movement of the rear wheels, the rear wheels track laterally inside the prior incremental longitudinal axis of the vehicle at the initiation of any turning movement, and thus completely eliminating the possibility of striking any outwardly lateral obstruction.

These objectives are implemented according to the present invention with a digital control system and microprocessor at a cost not exceeding what many sophisticated sound systems cost in present day passenger vehicles. The front wheels are steered with a conventional power steering system that includes a manually rotatable steering wheel. This conventional steering assembly rotates a low ratio steering shaft surrounded by a fixed annular array of terminals that are selectively actuated by a wiper contact carried by the steering shaft. In the example given, there are 32 annularly arrayed contacts, but more can be used such as 64 or 128, any number of compatible with known digital registers, the number being selected to achieve the desired amount of control accuracy.

This annular array of terminals is scanned by a scan register driven by a clock oscillator that sequentially and serially scans or samples the terminals in a plurality of repeating scan cycles. The scan register produces a pulse each time it scans past the crossover of terminal 31 and terminal 0 which is aligned with the longitudinal axis of the vehicle, and thus this signal indicates the longitudinal axis of the vehicle and is utilized as a reference signal for the beginning of each scan cycle.

The scan register produces a second pulse as it scans the terminal actuated by the contact on the steering shaft. The time period between the generation of the reference pulse in each scan cycle and the activated terminal pulse in the same cycle is a representation of the angle of the steering shaft, and this is calculated by a digital angle register driven by the same clock, preset by the reference pulse and reset by the scan register angle pulse.

In this way the count in the angle register is a representation of the angle $\theta_F$ for each scan cycle.

A $\theta_R$ generator is provided that derives $\theta_R$ drive signals in response to the count in the $\theta_F$ register. This $\theta_R$ generator includes a microprocessor, a data memory, and a program memory, the latter of which may include algorithms to those described in this application, such as angular acceleration algorithms, velocity responsive angle suppression algorithms, and road surface algorithms if desired, although these additional algorithms are not essential to the principles of the present invention. The data memory stores the $\theta_F$ information in the angle register for a period of time determined by the program memory. The storage time or delay time is determined by a delay D, which is a function of a distance s traveled by the vehicle. That is, the delay is not a function of time but is a function of distance traveled. For example, for a wheelbase of 120 inches, one s is 53.3 inches and exemplary delay for low speed turning maneuvers is 1.85 s or 98.7 inches. The delay distance is increased by the program memory with vehicle speed in accordance with a program or algorithm developed from actual driving experimentation. The delayed $\theta_F$ information in the data memory is interfaced by the microprocessor with a $\theta_R$ demodulator that essentially utilizes the delayed $\theta_F$ information to modulate a sine wave with the modulated sine wave driving a $\theta_R$ servo driver for the rear wheels.

The program memory also presets the microprocessor to determine when the $\theta_R$ increasing signals are equal to the $\theta_F$ decreasing signals, or some percentage thereof, so that thereafter the $\theta_R$ signals are directly in time phase with the $\theta_F$ signals even though the $\theta_R$ control signals may be suppressed by some ancillary algorithm in the program memory.

Other objects and advantages of the present invention will appear in the following detailed description.

DETAILED DESCRIPTION OF THE PREFERRED EMBODIMENT

Figure 1:
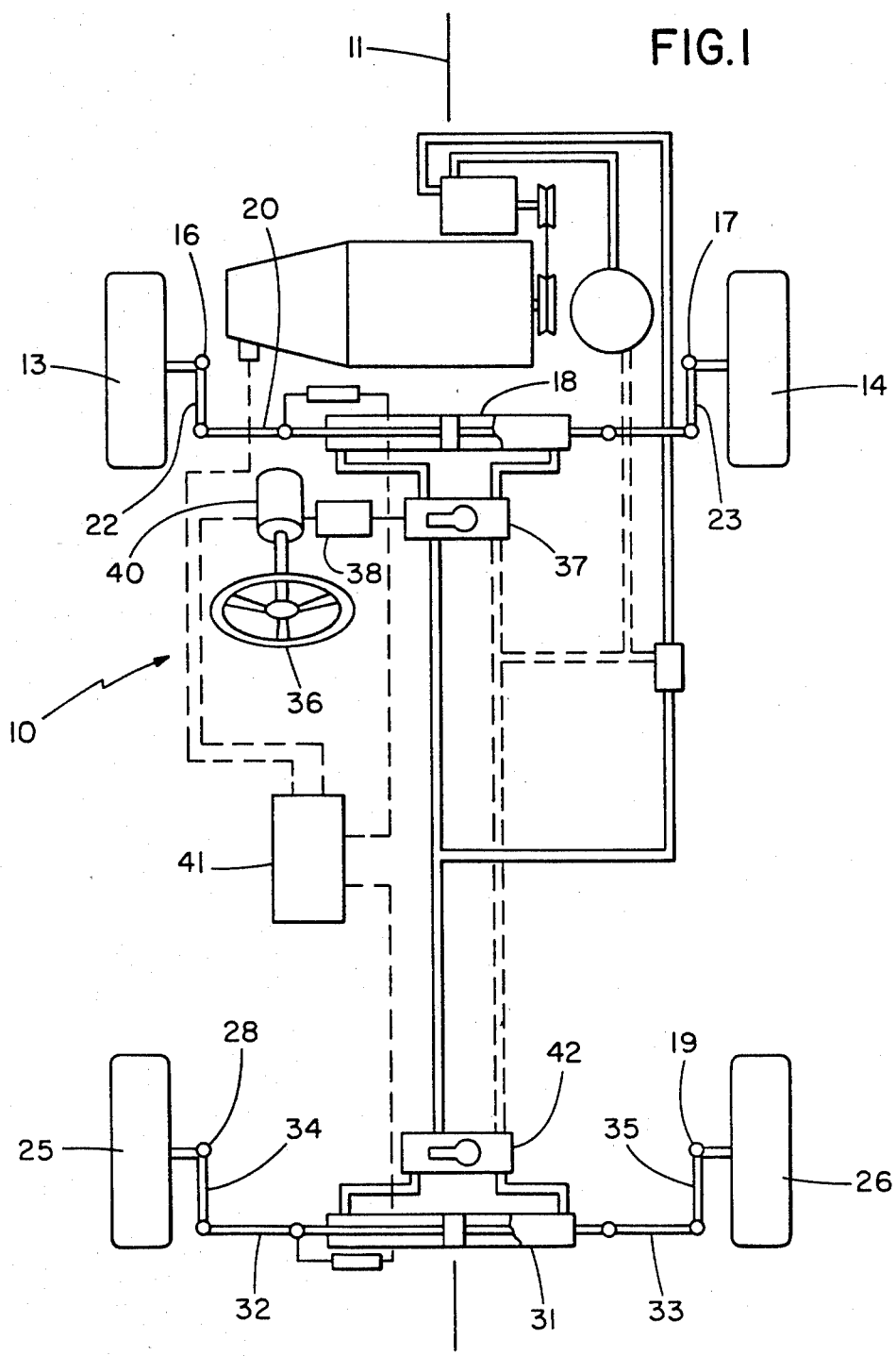
FIG. 1 is a generally schematic top view of a vehicle incorporating the present four wheel steering system.

Referring to the drawings and particularly FIG. 1, a non-articulated vehicle 10 is illustrated according to the present invention primarily designed for passenger-type vehicles. While no frame or unitized body is illustrated in vehicle 10 it should be understood that vehicle 10 does in fact have a rigid non-articulated frame or unitized body having a central longitudinal axis 11 that is defined hereinafter as a reference axis for determination of wheel angles.

Vehicle 10 includes front wheels 13 and 14 having pivot pins 16 and 17 fixed with respect to the frame or body, pivoted simultaneously by a hydraulic actuator 18 through rods 20 and 21 and short pivot arms 22 and 23.

Rear wheels 25 and 26 are pivoted about pins 28 and 29 also fixed with respect to the frame or body by hydraulic actuator 31 acting through piston rods 32 and 33, and short pivot arms 34 and 35.

The vehicle includes a conventional rotatable steering wheel 36 that positions a front wheel steering servo valve 37 through a conventional front wheel steering gear box 38.

A front wheel steering angle sensor 40 is scanned by a scanning register in an on-board control circuit 41 that controls the angular position of gear wheels 25 and 26 by controlling the position of rear wheel servo valve 42.

In FIGS. 2 through 8 a plurality of graphic diagrams illustrate the longitudinal axis of a vehicle in its various positions during turning maneuvers under various conditions to be explained with respect to each of the figures. In each, the vehicle is represented by a single line with the length of the line being equal to the wheelbase of the vehicle or more prticularly the axial spacing of the pivot pins 16, 17, and 28, 29. The intersection of a line extending between pivot pins 16, 17 and the longitudinal axis (the reference axis) 11 is depicted in all of these illustrations by a circle surrounding a dot, and this corresponds, of course, to the front of the vehicle, and a point where a line extending between the rear pivot pins 28, 29 intersects the same reference axis 11 is depicted by a square surrounding a dot and, of course, corresponds to the rear of the vehicle. Therefore, in viewing these graphic illustrations, the movement of the front of the vehicle can be traced by connecting the circles and the path of the rear of the vehicle can be traced by connecting the squares.

In FIGS. 2 to 6, an identical turning maneuver of steering wheel 36 is effected all with the vehicle traveling at the same speed of velocity V. Thus, these are constants for all FIGS. 2 to 6 illustrations.

Generally, FIGS. 3 through 6 show changes in steering sensitivity for the same turning maneuver by varying the delay distance for initiation of rear wheel turning and controlling rear wheel over-steering as the vehicle comes out of a turn.

Figure 2:
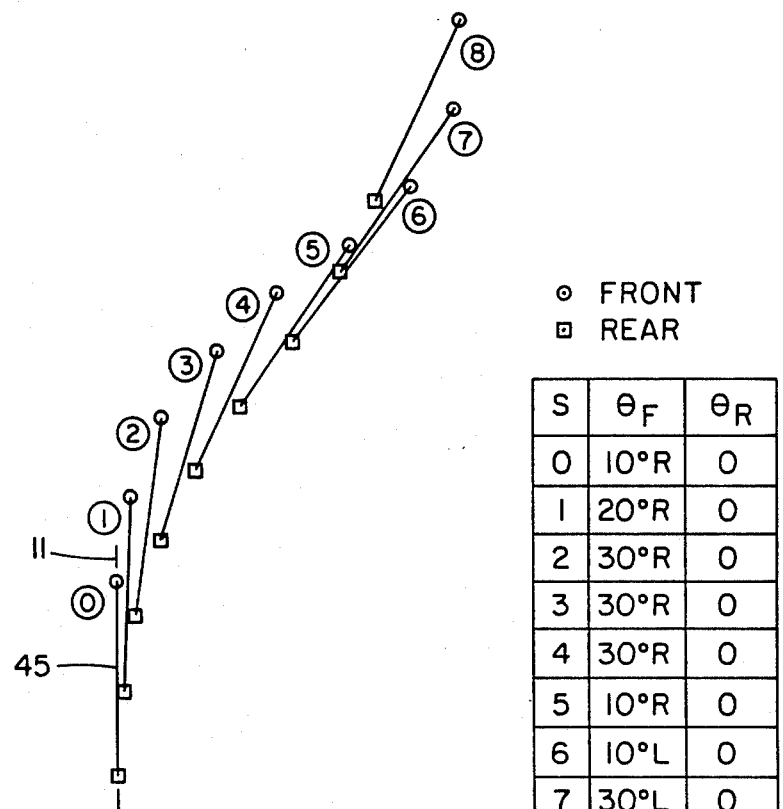
FIG. 2 is a schematic graphic of the incremental positions of a two wheel steering vehicle for a given turning maneuver including an incremental distance-angle chart.

In viewing FIG. 2 and its chart, the movement of a front wheel only drive vehicle 45 is illustrated in 8 incremental positions numbered 1 through 8 in a turning maneuver that includes incrementally positioning the front wheels to a 30 degree right position, returning the front wheels to straight ahead and then to a 30 degree left position at position No. 8. The circled numbers 1 to 8 indicate vehicle position and are located at the front of the vehicle, and note that at position 0 $\theta_F$ already has a 10 degree right angle. $\theta_F$ is the angle of the front wheels with respect to the longitudinal reference axis 11, and $\theta_R$ is the angular position of the rear wheels wich respect to the reference axis 11. In FIG. 2, since there is no rear wheel steering $\theta_R$ equals 0 at all incremental positions.

The angles $\theta_F$ are the same in each of FIGS. 2, 3, 4, 5 and 6, since these figures attempt to illustrate the same identical turning maneuver with the front wheels.

A general thing to note with respect to FIG. 2 in comparing it to the maneuvers in FIGS. 3, 4, 5 and 6, the latter all being four wheel steering maneuvers, is that the total turning movement with two wheel steering is far less than it is with four wheel steering, and the reason for this in viewing FIG. 2, is that upon initiation of the turn, the rear end of the vehicle represented by the squares at positions 1, 2 and 3, scribes a path significantly inside the front end of the vehicle, and it maintains a path inside until the vehicle comes completely out of the turn between positions 6 and 7.

Figure 3:
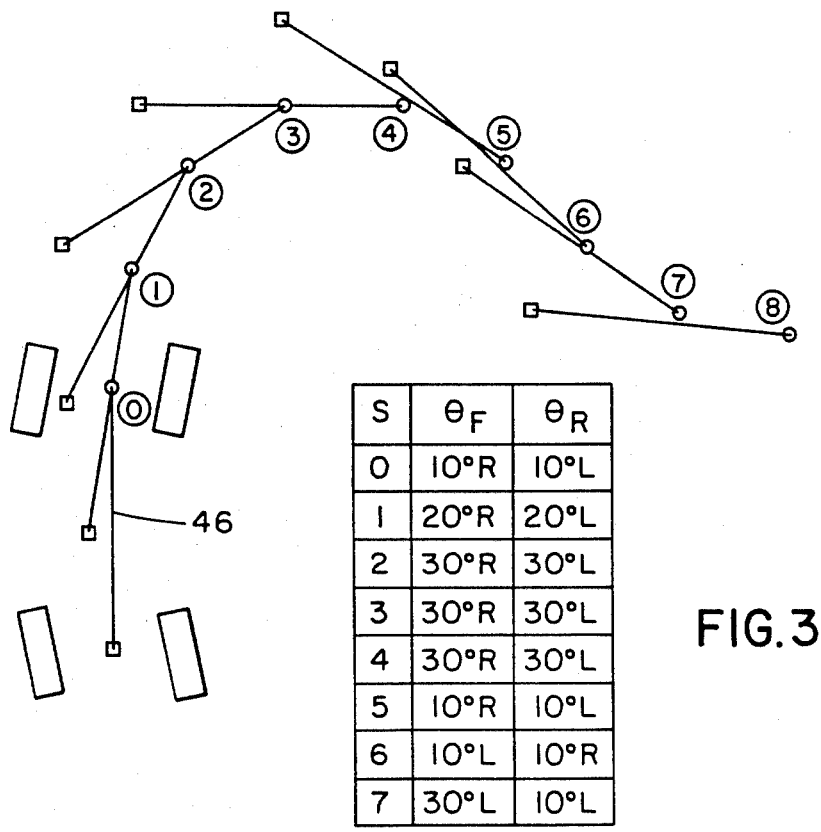
FIG. 3 is a schematic graphic of the incremental positions of a one to one four wheel steering vehicle for the same turning maneuver shown in FIG. 1 including an incremental distance-angle chart.

In FIG. 3, a conventional one to one four wheel steering wheel system is illustrated. This system is exemplary of a one to one mechanical or hydraulic interconnection between the front steering system and the rear steering system so that, for example, as the front wheels turn 20 degrees right, the rear wheels turn 20 degrees left. Note that the total vehicle turn at position 7 in FIG. 3 is approximately 130 degrees compared to the some 40 degrees of total turning movement with two wheel steering in FIG. 2. The reason for this dramatically increased sensitivity steering in the one to one steering vehicle 46 is that as can be seen in FIG. 3, the rear end of the vehicle moves immediately outside the path of the front wheels at the initiation of a turn and remains considerably outside the front path until position 6 is reached.

Figure 4:
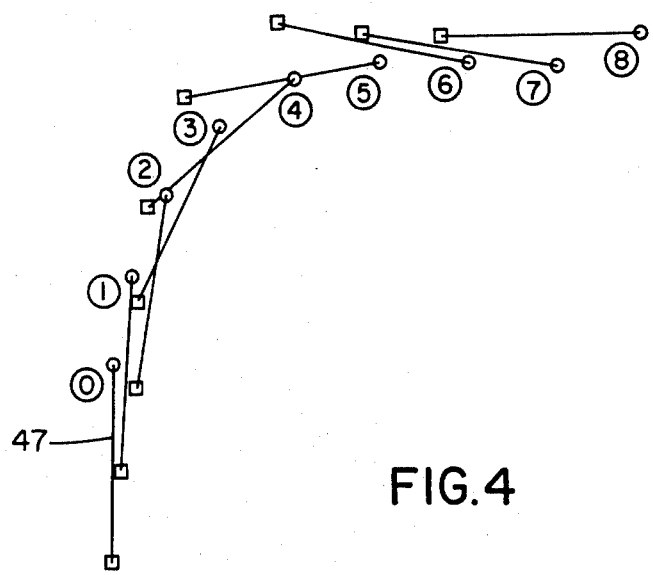
FIG. 4 is a schematic graphic of the incremental positions of the present four wheel steering vehicle shown in FIG. 1 including an incremental distance-angle chart with the present rear wheel turn delay but without the present third turning segment control.
Figure 5:
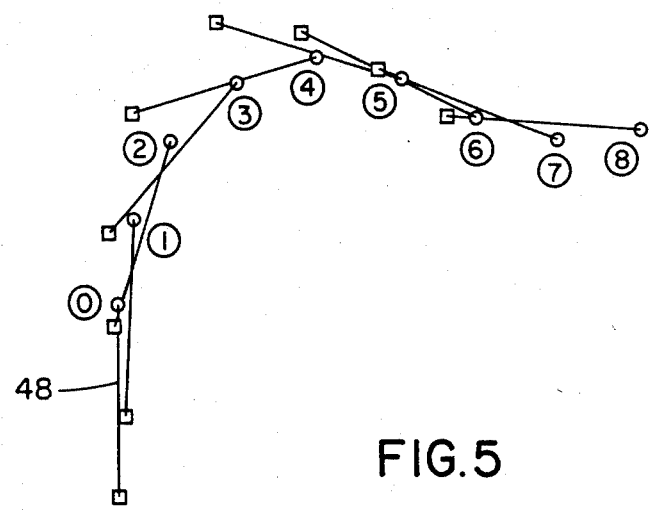
FIG. 5 is a schematic graphic of the incremental positions of the present four wheel steering vehicle shown in FIG. 1 including an incremental distance-angle chart for the same turning maneuver with the present rear wheel turn delay and with the present third turn segment steering control.
Figure 6:
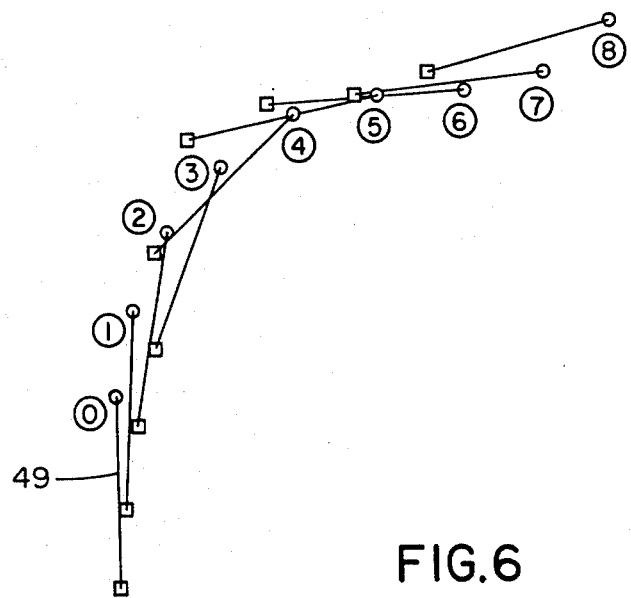
FIG. 6 is a schematic graphic of the incremental positions of the present four wheel steering vehicle shown in FIG. 1 including an incremental distance-angle chart for the same turning maneuver similar to FIG. 5 with a longer delay distance.

FIGS. 4, 5, and 6 illustrate the same turning maneuver as in FIGS. 2 and 3 but with the present rear wheel steering system incorporated. According to the present invention, the rear wheels are positioned to an angle $\theta_R$ equal to the front wheel angle $\theta_F$ earlier in the turn. The delay distance for applying the front wheel information to the rear wheels in FIG. 4, is D=2s where s=1/2.25×Wb, the wheelbase of the vehicle. Thus, 2s would in the FIG. 4 example be D=106.67 inches for a vehicle having a wheelbase of 120 inches. Because the delay D is 2s, the wheel angle $\theta_R$ is 0 at chart positions 0 and 1. Then, at chart positions 2, 3, 4, 5 and 6, the rear wheel angles $\theta_R$ are incrementally identical to the front wheel angles $\theta_F$ at chart positions 0 to 4. The result of this rear wheel program is that, and as can be seen from the FIG. 4 graphic, the rear wheels track inside the front wheels at the initiation of the turn and continue to track inside the front wheels until the vehicle reaches graph position 4 where the rear wheels begin tracking outside the front wheel path. In chart positions 5 and 6 the rear wheels swing considerably out in mid turn providing excellent steering response in mid turn. However, as the vehicle begins coming out of the turn between positions 6 to 8, (chart increments 5, 6 and 7), the rear of the vehicle continues to track considerably outside the path of the front wheels inhibiting the driver's out of turn movement.

It should be understood that the present control circuit calculates $\theta_R$ at vastly smaller intervals than shown in FIGS. 4 to 8 and the larger incremental disclosures shown are only for purposes of illustration.

In FIG. 6, the turning maneuver of vehicle 49 is identical to vehicle 47 in FIG. 4 and has the same delay distance D=2s, but here the present steering system includes not only the D delay distance program but further includes a program for the final segment of the turn that improves the final segment and prevents oversteering of the rear wheels. This final program or algorithm overrides the delay distance program when the angle $\theta_F$ of the front wheels equals $\theta_R$ of the rear wheels. This is what happens as the driver is coming out of a turn as he returns the steering wheel back to its neutral position in alignment with the reference axis.

Since the delay program or algorithm utilizes delayed $\theta_F$ to generate $\theta_R$, $\theta_R$ would, under the delay program alone, continue to ascend at the final segment of the turn as $\theta_F$ decreases and in fact may actually increase above $\theta_F$ as shown by charted points 5 and 6 in the FIG. 4 delay only program. The final segment algorithm determines when $\theta_R$ equals $\theta_F$ and at that point locks $\theta_R$ on $\theta_F$ equal in magnitude and time phase. That is, at charted point 5 in FIG. 6, $\theta_R$ equals 10 degrees left because $\theta_F$ is 10 degrees right at that location. Note that in FIG. 4 at chart point 5, $\theta_R$ is 30 degrees left. Thus, the final segment algorithm is seen in FIG. 6 to provide improved response in the final segment of a turning maneuver.

In FIG. 5 both the delay distance D program and the final segment blocking program are utilized, but the delay distance D is reduced from 2s to 1s. As can be seen generally in comparing the total vehicle turn in FIG. 5 with FIG. 6, the vehicle turns approximately 25 degrees more by reducing the delay distance from 2s to 1s. The reason for this is that with a shorter delay distance of 1s, the rear end of the vehicle in FIG. 5, moves outside the path of the front wheels more quickly and beginning at position 2, while in the FIG. 6 program rear wheel movement outside the path of the front wheels does not begin until position 4. While the primary algorithms for controlling rear wheel angle $\theta_R$ apply unmodified $\theta_F$ angles for rear wheel control, it should be understood that further $\theta_R$ suppression algorithms could be utilized in addition to the ones described herein.

Figure 7:
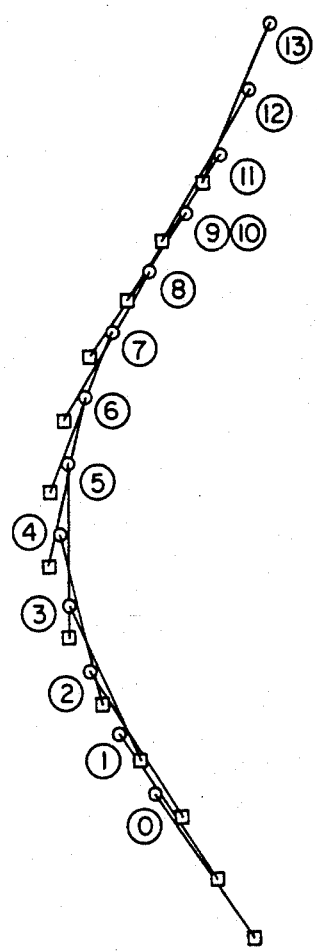
FIGS. 7 and 8 are expanded graphic representations of incremental vehicle position during a different turning maneuver than illustrated in FIGS. 2 through 6, a high speed turning maneuver, with a delay distance in FIG. 7 of 2s and a delay distance in FIG. 8 of 4s.
Figure 8:
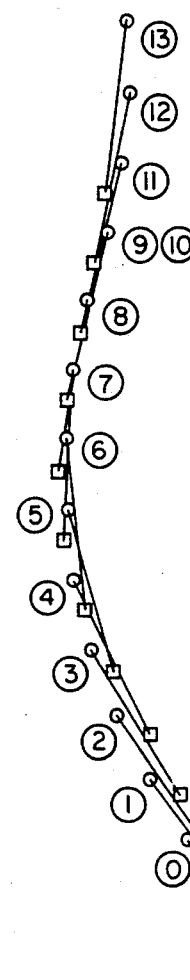

FIGS. 7 and 8 illustrate a different turning maneuver than illustrated in FIGS. 2 to 6 and are intended to depict, as can be seen from the FIGS. 7 and 8 charts, a longer turning maneuver having a maximum forward wheel angle $\theta_F$ of 20 degrees. This maneuver represents a high speed maneuver. The programs controlling the FIG. 7 graphic is identical to that in FIG. 6, i.e., D=2s with final segment locking. In FIG. 8, the program is the same except that D has been increased to 4s. Generally comparing FIGS. 7 and 8, it can be seen that the total turning angle of the maneuver in FIG. 7 is approximately 68 degrees while the total turning maneuver in FIG. 8 is approximately 53 degrees illustrating that delay distance D is inversely proportional to steering sensitivity. That is, as the delay distance increases, steering response decreases.

It is desirable that the response decrease in response to an increase in vehicle velocity. However, this decrease in response is not proportional and is determined by experimentation and programed into the program memory described in more detail below.

Figure 9:
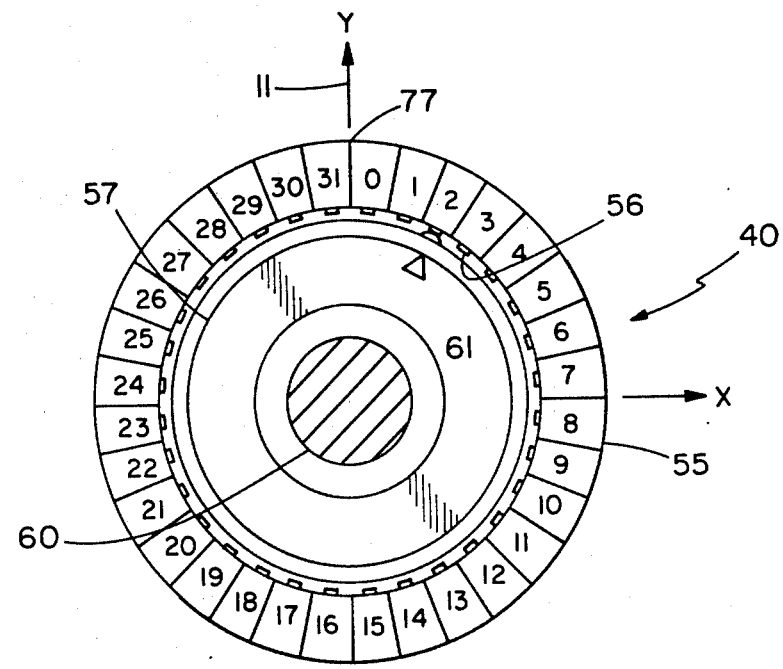
FIG. 9 is a plan view, partly in section of the annularly arrayed terminal assembly around a steering shaft.
Figure 10:
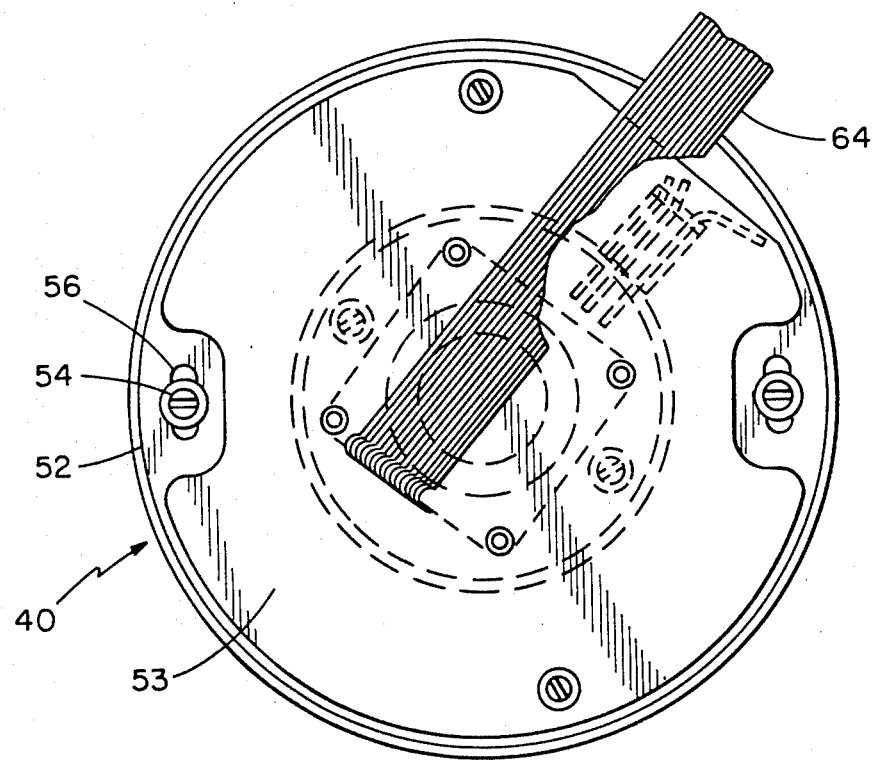
FIG. 10 is a partly perspective view of the terminal assembly illustrated in FIG. 9 with a ribbon conductor.
Figure 11:
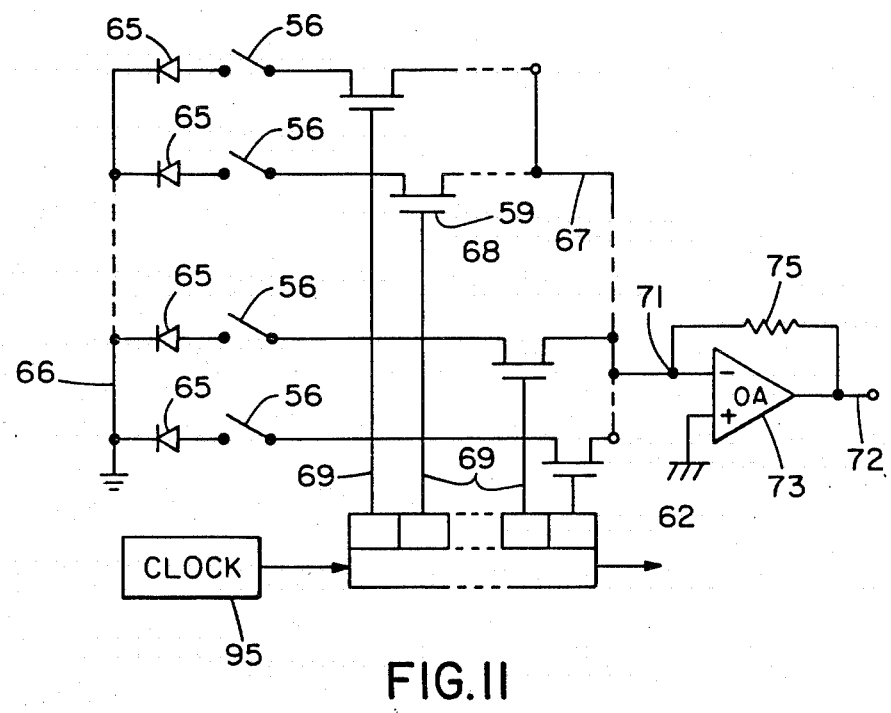
FIG. 11 is a schematic circuit of the scan register.

The angle sensor 40 for sensing $\theta_F$ described above in connection with FIG. 1 is shown in more detail in FIGS. 9, 10 and the scanning circuit of FIG. 11. Angle sensor assembly 40 as seen in FIGS. 9 and 10 includes an annular housing 52 designed to be fixed with respect to the vehicle frame or body that carries a base plate 53 fastened to the housing by spaced fasteners 54 that extend through elongated slots 56 in the housing 52 to permit small angular adjustments of the plate 53 to make minor reference corrections to the angle sensor assembly 40. Plate 53 carries an annular terminal ring 55 fixed thereto that has a plurality of contacts 56 in this case numbering 32 that surround an annular steering member 57 carrying a wiper contact 58 that serially engages the terminal contacts 56 as the member 57 rotates within the terminal ring 55. Member 57 is connected to steering shaft 60. Steering shaft has a gear ratio such that it does not rotate in either direction from a neutral position more than 180 degrees to the lock positions.

In the exemplary embodiment shown the terminal ring 55 had 32 terminals 56 but a greater number such as 64 or 128 compatible with known digital registers may be utilized for greater control accuracy if that is found desirable.

The steering member 55 carrying wiper contact 58 has an arrow 61 aligned with the wiper 58 so that it can be located for repair, inspection or calibration. Wiper contact 58 and arrow 61 when positioned between the terminals at ring locations 31 and 0 on ring 55 are aligned with vehicle reference axis 11 and in this position the front wheels have $\theta_F=0$.

As the steering shaft 60 is rotated and wiper contact 58 engages the contacts 56 it energizes the engaged one of the contacts 56 which tells a scanning register the angular location of the energized contact from the reference axis.

The terminals 56 are each connected through one of the conductors in a ribbon conductor 64 to a photosensitive diode 65 in the scanning circuit as seen in FIG. 11. An MOS transistor switch 59 is connected in series with each diode 65, the series arrangement being connected between a ground or common line 66 and output line 67. The base 68 of each of the transistors 59 is connected to a scan register 62 (FIGS. 12 and 13) which may be a ring counter. The scan register 62 has 32 output leads 69, one lead being connected to the base 68 of each of the transistors 59, and the scan register 62 sequentially biases transistors 59 on as it steps through its 32 positions. When an energized terminal is sampled, the associated transistor 59 is turned on and current flow of the corresponding diode flows into summing junction 71. The output 72 of ampliflier 73 will change accordingly to produce an opposite current into the summing point 71 through resistor 75 in a well known manner. As the scan register 62 steps or counts through its 32 positions in a complete scan cycle, the transistors 59 are sequentially turned on.

Figure 12:
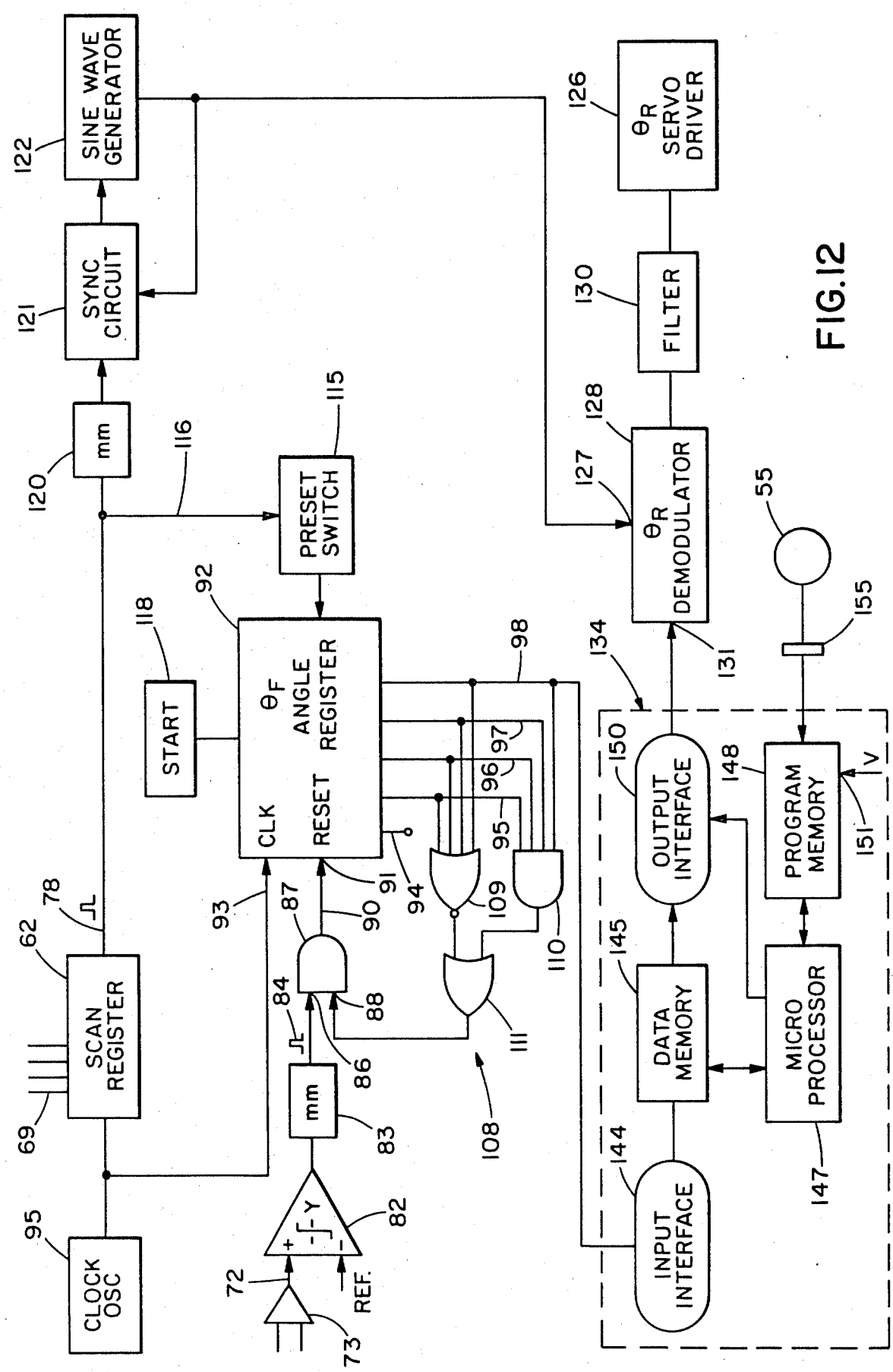
FIG. 12 is a block diagram of the entire control system according to the present invention.

The scan register 62 and the associated circuitry shown in FIG. 11 are illustrated more schematically in FIG. 12 which illustrates the entire control and programming circuitry according to the present invention. The following description assumes that the scan register 62 scans the terminal array 55 in a clockwise direction.

Each time the scan register 62 moves past the reference point 77 (aligned with the reference axis 11 in FIG. 9) in going from terminal 31 to terminal 0, register 62 generates a sync pulse, and the sync pulse appears on output 78 illustrated in FIG. 12.

Figure 13:
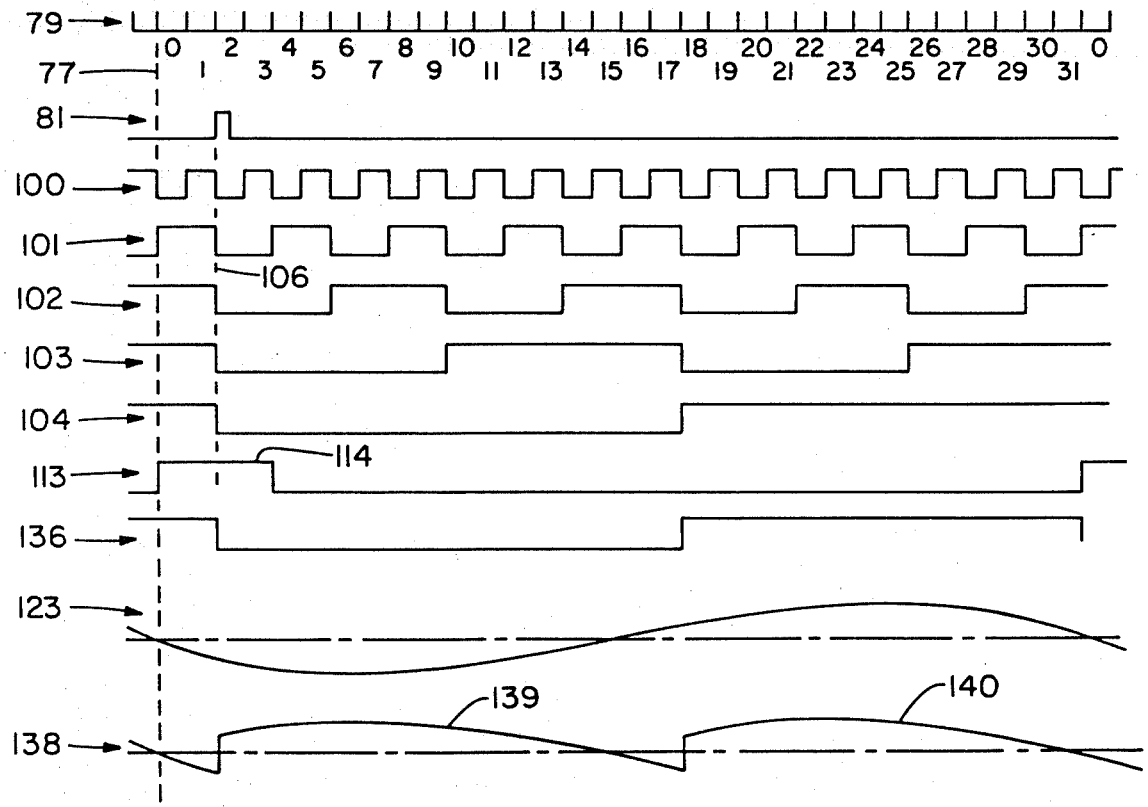
FIG. 13 is a signal chart illustrating the developed signals at various points in the circuit illustrated in FIG. 12.

With reference FIG. 13, the reference numeral 79 indicates a chart representing the time sequence of the scan register 62 as it sequentially samples the terminals 56. Because of the regular angular spacing and equal sizes of the terminals 56, the sampling time intervals for the terminals are equal and the terminals are scanned sequentially. The number in each space of chart 79 in FIG. 13 identifies the terminal 56 which is being sampled at a specific time, and the time is considered as increasing toward the right, the reference time or point 77 occurs when the register 62 shifts from terminal 31 position to the terminal 0 position. The reference point 77 is aligned with the Y axis. The $\theta_F$ between the Y axis and the terminal being sampled is in these circumstances a function of time; so that the time from the reference time 77 in FIG. 13 is equivalent to the angle $\theta_F$ of the photocell being sampled.

Also shown in FIG. 13 is curve or signal 81 that represents the voltage outputs of the terminals 56 as seen at the operational amplifier 73 over one scan, which is the voltage on the output 72. With reference to FIG. 11, the instantaneous voltage signal 81 appearing on the output 72 of the amplifier 73 will be a function of engagement by wiper contact 58 on steering member 57. For the position of the wiper contact 58 in FIG. 9 terminals 3 through 1 are not actuated and terminal 2 is actuated so that signal 81 during the sampling of all the terminals will be high and the other terminals low.

Viewing FIGS. 12 and 13, the voltage level at the output 72 of amplifier 73 causes a level detector 82 to switch, triggering one-shot or monostable multi-vibrator 83 which has its input connected to the output line of level dector 82. Multi-vibrator 83 generates a relatively short squared pulse 84 seen on line 81 in FIG. 13 corresponding to terminal 2. Pulse 84 is connected to one input 86 of And gate 87. Assuming for the time being that the other input 88 of the AND gate 87 has a positive going signal appearing thereon, a positive pulse will appear on the output 90 of the AND gate 87, and this pulse is connected to the reset input 91 of a scan register 92 including a five stage binary counter. The register 92 has a clock input 93 connected to the output of a clock oscillator 95 which also drives the scan register 62. After each time the register 92 is reset by a pulse 84, the scan angle register 92 starts a new count of the pulses received from the clock oscillator 95. The scan angle register 92 has 5 outputs 94, 95, 96, 97, and 98 which are connected to successive stages of the counter. With reference to FIG. 13, the reference numerals 100, 101, 102, 103 and 104 respectively represent the voltage signals appearing on the outputs 95 to 98.

Since the rising or leading edge of the pulse 84 coincides with the terminal 2 and the detection of the wiper contact 58 on steering member 57, as the terminals 56 are scanned, it will be apparent that the scan angle register 92 will begin a new count in synchronism with the detection of the moveable wiper 58 during each scan. The reference number 77 in FIG. 13 indicates the zero or reset time the register 92 begins a new count. And the time 106 is equivalent to the angle $\theta_F$, as previously mentioned.

To prevent spurious signals from resetting the counter 92 more than once in each complete scan of array 55, a window circuit 108 (FIG. 12) is provided to permit the pulse 84 to pass through the AND gate 86 to the scan angle register 92 but to block other pulses. The window circuit 108 comprises a NOR gate 109, having four inputs connected to the four outputs 95 to 98 of the register 92, and AND gate 110 having four inputs connected to the same four outputs of the scan angle register 92, and an OR gate 111 having two inputs, one connected to the output of the NOR gate 109 and the other connected to the output of the AND gate 110. The output of the OR gate 111 is connected to the input 88 of the AND gate 87. The output of the OR gate 111 has a high output when either of its two inputs are high. The output of the NOR gate 109 will be high only when all of its inputs are low, and the output of the AND gate 110 will be high only when all of its inputs are high. With reference to FIG. 13, it will be noted that the signals 100 to 104 are all high for the two counts or cycles just preceding the time 106, and therefore, the output of the AND gate 110 will be high for these two cycles. Similarly, it will be noted that the signals 100 to 104 are all low for the two cycles immediately following the time 106, and for these two following cycles, the NOR gate 109 will produce a high signal. Consequently, the output of the OR gate 111, represented by waveform 113 in FIG. 13, will be high as indicated by the pulse 114 for the two cycles just prior to the time 106, and also for the two cycles just following the time 106. The pulse 114 may be considered a window pulse and is connected to the input 88 of the AND gate 87 and it enables the pulse 84 from the multi-vibrator 83 to pass to the scan angle register 92. The window pulse 114 exists only during this short period of time, and for the remainder of the scan cycle, signals cannot pass to the scan angle register 92 and reset it. Since the steering angle will not change faster than a small increment from one scan cycle to the next, the pulse 84 will coincide with the window pulse 114.

The preset switch 115 shown in FIG. 12, connected by line 116 to the output 78 of scan register 62, and a start switch 118 are provided to initially activate the system in operation.

The sync pulse generated each time the register 62 counts past the reference point 77, actuates a one-shot or monostable multi-vibrator 120 which has its output connected to set the input of a sync circuit 121, having its output connected to the input of a sine wave generator 122. The output of the generator 122 is also connected to an input of the sync circuit 121, and the generator 122 provides a sine wave 123 illustrated in FIG. 13 in a manner well known to those skilled in the motor control art. There is a zero crossing of the sine wave 123 which is synchronized with the time of occurrence of the reference point 77. The sine wave 123, in the present example, has a negative half cycle which occurs during the scan of the terminals numbered 0 through 15 and a positive half cycle which occurs during the scan of the terminals numbered 16 through 31. The output of the sine wave generator 122 is fed through a variable resistor (not shown) to obtain the desired amplitude of the sine wave and to thereby control the sensitivity of a servo driver 126 that controls rear steering actuator servo valve 42. The output of the sine wave generator 122 appears at input 127 of a demodulator 128, the output of which is connected through filter 130 to servo driver 126.

The demodulator 128 has an additional input connection 131 which is connected to the output of a rear wheel $\theta_R$ angle generator 134.

The output voltage of the demodulator 128 follows or corresponds to the voltage on the input 127 when the voltage on the input 131 has a high or positive value. When the voltage at the input 131 has a zero or low value, the demodulator inverts the input 127. The output of the $\theta_R$ angle generator 134 appears on the input 131 and is indicated by the waveform 136 in FIG. 13. As can be seen from FIG. 13, during the first half, or the first 180 degrees, the waveform 136 is low. During this time the sine wave will appear in inverted form at the output 138 (FIG. 13) of the demodulator 128, and this inverted portion is indicated by the reference numeral 139. During the second half of the count of the scan cycle, the output 98 is high and, therefore, the portion 140 of the output 138 follows the sine wave 123.

Filter 130 averages the output signal 138 of the demodulator 127. Viewing FIG. 13, the majority of the signal 138 is above the zero reference line and, consequently, the output of the filter 130 is a positive voltage which represents the average of the signal 138. The output of the filter 130 is connected to the $\theta_R$ servo driver 126 for the rear wheel steering servo valve 40.

A rear wheel $\theta_R$ angle generator 134 delays the $\theta_F$ angle information in accordance with a delay distance algorithm for controlling rear wheel turning during the initiation of a turn, and terminates the delay algorithm and initiates a locking algorithm during the final segment of each turning maneuver. The optimum delay distance D, as described above, for a given speed of the vehicle is determined experimentally by selecting different delay distances D and comparing the results of actual steering manuevers at different speeds, but with the following general approximation.

As noted above in connection with FIGS. 8 and 9 the delay distance D increases with vehicle velocity so the steering response of the rear wheels decreases with speed. However, the distance D is not linearly proportional to speed, but follow this approximation:

$$D_i = D_r V_i / V_r k,$$

where $D_r$ are $V_r$ are low speed references for delay distance D and vehicle volocity V, $D_i$ is the instantaneous delay distance when $D_i > D_r$, $V_i$ is the instantaneous vehicle speed where $V_i > V_r$, and k is a constant where $k > 1$. Therefore, delay distance D increases at a lower rate than vehicle speed. This formula is part of the delay algorithm in memory program 148.

For example, if the response delay distance D at 15 mph is 2s where $s = 1/2.25$ Wb, wheelbase, and it was disired to have a 4s delay distance at 60 mph, then $k = 2$, because $$4s = (2s\ 60)/(15k)$$

The $\theta_R$ register 134 includes an input interface 144 that receives the count in angle register 92, a data memory 145 for storing the $\theta_F$ angles from register 92, a microprocessor 147 that applies the two primary delay and lock algorithms in program memory 148 to the $\theta_F$ angle memory 145 and an output interface 150 to the input 131 of demodulator 128.

The algorithm for delay distance D in program memory 134 is controlled in part by the vehicle velocity voltage value input 151 to the program memory 148. The algorithm for the final segment is also in program memory 148, and it is simply an algorithm that compares the count at the input interface 144 which corresponds to the instantaneous $\theta_F$ angle and the delayed output of data memory 145, which corresponds to instantaneous $\theta_R$, and when they are equal or same fixed constant of equal, this locking algorithm terminates the delay distance algorithm and applies the output of the input interface 144 directly (or through constant multiplier in microprocessor 147) to the input of the output interface 150 by-passing data memory 145. Thus, when the final segment algorithm in program memory 148 is activated by microprocessor 147, the $\theta_R$ signals at the input of demodulator 128 are proportional or equal to and timed with the instantaneous $\theta_F$ angles in angle register 92 so that there is no delay between the two and the rear wheels will turn exactly with the front wheels, until such time as the wiper contact 58 is moved back to a neutral position between terminals 0 and 31 which through appropriate circuitry drives a one shot 155 in FIG. 12 that produces a pulse for terminating the locking algorithm and resetting the delay distance algorithm in program memory 148.

The delay algorithm is then prepared to survey the initiation of the following turning maneuver and begin the dual or triple algorithm cycles over again.

It should be noted that the program memory 148 may contain additional algorithms to suppress the ratio of $\theta_R/\theta_F$, if desired to reduce turning response further, but these secondary algorithms form no part of the present invention other than the fact that they may be utilized in conjunction and superimposed on the delay distance and locking algorithms according to the present invention.

Furthermore, while the present invention is shown with conventional four wheel steering, it may also be used with hybrid four wheel steering systems such as those that program conventional four wheel steering at low speeds and crab steering at high speeds.

I claim:

1. In a four wheel steering system for a nonarticulated vehicle having a front pair of steerable wheels positioned by a first steering motor to angles $\theta_F$ and a rear pair of steerable wheels positioned by a second steering motor to angles $\theta_R$, a control for the first and second steering motors, comprising: manually operable steering means for controlling said first steering motor to position said front pair of steerable wheels at angles $\theta_F$, means for sensing the angles $\theta_F$ and developing $\theta_F$ information therefrom, control means for controlling the second steering motor in response to the $\theta_F$ information to position the rear wheels at angles $\theta_R$, and means responsive to the developed $\theta_F$ information for delaying the $\theta_F$ information where the delay is proportional to vehicle travel distance and applying it modified or unmodified as $\theta_R$ information to the rear wheel control means, said means for delaying the $\theta_F$ information being operable throughout a substantial portion of the speed range of the vehicle so that the delay not only assists in avoiding low speed rear end swing-out but also reduces steering sensitivity throughout a substantial portion of the speed range.

2. In a four wheel steering system for a nonarticulated vehicle as defined in claim 1, wherein the means for delaying the $\theta_F$ information and applying it as $\theta_R$ information is operable at the initial movement of the manually operable means from a neutral position.

3. In a four wheel steering system for a nonarticulated vehicle having a front pair of steerable wheels positioned by a first steering motor to angles $\theta_F$ and a rear pair of steerable wheels positioned by a second steering motor to angles $\theta_R$, a control for the first and second steering motors, comprising: manually operable steering means for controlling said first steering motor to position said front pair of steerable wheels at angles $\theta_F$, means for sensing the angles $\theta_F$ and developing $\theta_F$ information therefrom, control means for controlling the second steering motor in response to the $\theta_F$ information to position the rear wheels at angles $\theta_R$, and means responsive to the developed $\theta_F$ information for delaying the $\theta_F$ information and applying it modified or unmodified as $\theta_R$ information to the rear wheel control means, the means for delaying the $\theta_F$ information and applying it as $\theta_R$ information being operable at the initial movement of the manually operable means from a neutral position, the means for delaying the $\theta_F$ information and applying it as $\theta_R$ information including a memory for storing the $\theta_F$ information, and means for varying the delay by controlling the time of retrieval of the $\theta_F$ information from the memory.

4. In a four wheel steering system for a non-articulated vehicle as defined in claim 1, wherein the means for delaying the $\theta_F$ information and applying it as $\theta_R$ information includes means for controlling the duration of the delay, said means for controlling the duration of the delay being responsive to a predetermined distance traveled by the vehicle.

5. In a four wheel steering system for a non-articulated vehicle having a front pair of steerable wheels positioned by a first steering motor to angles $\theta_F$ and a rear pair of steering wheels positioned by a second steering motor to angles $\theta_R$, wherein said front wheels travel in a front path and said rear wheels travel in a rear path, a control for the first and second steering motors, comprising: first control means for the first steering motor to initiate a turn to begin travel of the front wheels in a curved front path, and second control means for the second steering motor to position the rear wheels so they define a rear path radially inside the front path at the initiation of a turn without turning in the same direction as the front wheels and then a rear path radially outside the front path to provide improved steering response with control, said second control means being operative throughout a substantial portion of the speed range of the vehicle.

6. In a four wheel steering system for a non-articulated vehicle as defined in claim 5, wherein the vehicle has a longitudinal axis defined as a reference axis, said second control means for the second steering motor positioning the rear wheels at an angle $\theta_R=0$ with respect to the reference axis at the initiation of a turn for a predetermined period.

7. In a four wheel steering system for a non-articulated vehicle as defined in claim 6, wherein the predetermined period is determined by movement of the vehicle through a predetermined distance s.

8. In a four wheel steering system for a non-articulated vehicle having a front pair of steerable wheels positioned by a first steering motor to angles $\theta_F$ and a rear pair of steering wheels positioned by a second steering motor to angles $\theta_R$, wherein said front wheels travel in a front path and said rear wheels travel in a rear path, a control for the first and second steering means, comprising: first control means for the first steering motor to initiate a turn to begin travel of the front wheels in a curved front path, and second control means for the second steering motor to position the rear wheels so they define a rear path radially inside the front path at the initiation of a turn without turning in the same direction as the front wheels and then a rear path radially outside the front path to provide improved steering response with control, the vehicle having a longitudinal axis defined as a reference axis, said second control means for the second steering motor positioning the rear wheels at an angle $\theta_R=0$ with respect to the reference axis at the initiation of a turn for a predetermined period, the predetermined period being determined by movement of the vehicle through a predetermined distance s, the distance s being less than the vehicle wheelbase for at least vehicle speeds under 44 ft./sec.

9. In a four wheel steering system for a non-articulated vehicle having a front pair of steerable wheels positioned by a first steering motor to angles $\theta_F$ and a rear pair of steerable wheels positioned by a second steering motor to angles $\theta_R$, wherein the vehicle has a longitudinal axis defined as a reference axis, the combination comprising; control means for the first steering motor to position the front wheels at angles $\theta_F$ with respect to the reference axis, and control means for the second steering motor to position the rear wheels at angles $\theta_R$ with respect to the reference axis, said second control means being responsive to the first control means increasing front wheel angles $\theta_F$ to initiate a turn for maintaining the rear wheels at an angle $\theta_R=0$ for a predetermined period unrelated to the magnitude of $\theta_F$.

10. In a four wheel steering system for a non-articulated vehicle as defined in claim 9, wherein the period $\theta_R=0$ is determined by an incremental distance traveled by the vehicle.

11. In a four wheel steering system for a non-articulated vehicle having a front pair of steerable wheels positioned by a first steering motor to angles $\theta_F$ and a rear pair of steerable wheels positioned by a second steering motor to angles $\theta_R$, wherein the vehicle has a longitudinal axis defined as a reference axis, the combination comprising; control means for the first steering motor to position the front wheels at angles $\theta_F$ with respect to the reference axis, and control means for the second steering motor to position the rear wheels at angles $\theta_R$ with respect to the reference axis, said second control means being responsive to the first control means increasing front wheel angles $\theta_F$ to initiate a turn for maintaining the rear wheels at an angle $\theta_R=0$ for a predetermined period, the period $\theta_R=0$ being determined by an incremental distance traveled by the vehicle, the distance traveled being less than the wheelbase W of the vehicle and greater than 0.5 W.

12. In a four wheel steering system for a nonarticulated vehicle having a front pair of steerable wheels positioned by a first steering motor to angles $\theta_F$ and a rear pair of steerable wheels positioned by a second steering motor to angles $\theta_R$, said vehicle having a longitudinal axis defined as a reference axis, the combination, comprising; first control means for controlling the first steering motor to position the front wheels at vary angles $\theta_F$ with respect to the reference axis, and second control means for controlling the second steering motor to position the rear wheels at varying angles $\theta_R$ independently of the first control means, said second control means increasing the rear wheel angles $\theta_R$ during initiation of a turn as the front wheel angles $\theta_F$ increase so that $\theta_R < \theta_F$ during an initial period, said second control means including means for sensing a decrease in $\theta_F$ at a time when $\theta_R$ is continuing to increase after the initial period and thereafter controlling the rear wheels so that $\theta_R = k\ \theta_F$, where k is constant.

13. In a four wheel steering system for a non-articulated vehicle as defined in claim 12, including means for sensing the angles $\theta_F$ and developing $\theta_F$ information therefrom, said second control means including program means for developing a program of $\theta_R$ information for the second control means, said means for sensing a decrease in $\theta_F$ including means for determining when $\theta_F = \theta_R/k$ as $\theta_F$ decreases and thereafter controlling the rear wheels so that $\theta_R = k\theta_F$.

14. In a four wheel steering system for a non-articulated vehicle having a front pair of steerable wheels positioned by a first steering motor to angles $\theta_F$ and a rear pair of steerable wheels positioned by a second steering motor to angles $\theta_R$, said vehicle having a longitudinal axis defined as a reference axis, the combination, comprising; first control means for controlling the first steering motor to position the front wheels at varying angles $\theta_F$ with respect to the reference axis, second control means for controlling the second steering motor to position the rear wheels at varying angles $\theta_R$ independently of the first control means, a manually operable steering assembly for at least in part controlling the first and second control means and providing angle information for at least the second control means, said steering assembly including an annular array of terminals and a rotatable manually controlled member mounted adjacent the annular array of terminals and having a descrete activator fixed thereon that serially activates the terminals as the member is rotated, said member being movable in either direction from a neutral position aligned with the reference axis, circuit means for determining which of the terminals is activated and calculating the angle $\theta$ through which the member is rotated, and means responsive to the circuit means for controlling the second control means.

15. In a four wheel steering system for a non-articulated vehicle having a front pair of steerable wheels positioned by a first steering motor to angles $\theta_F$ and a rear pair of steerable wheels positioned by a second steering motor to angles $\theta_R$, said vehicle having a longitudinal axis defined as a reference axis, the combination, comprising; first control means for controlling the first steering motor to position the front wheels at varying angles $\theta_F$ with respect to the reference axis, second control means for controlling the second steering motor to position the rear wheels by varying angles $\theta_R$ independently of the first control means, a manually operable steering assembly for at least in part controlling the first and second control means and providing angle information for at least the second control means, said steering assembly including an annular array of terminals and a rotatable manually controlled member mounted adjacent the annular array of terminals and having a descrete activator fixed thereon that serially activates the terminals as the member is rotated, said member being movable in either direction from a neutral position aligned with the reference axis, means for sequentially scanning the terminals in repeating scan cycles for developing each scan cycle a first signal at the crossover of the terminals at the reference axis and a second signal at the activated one of the terminals, a digital register, clock means providing a pulse train for driving the count in the register, said first signal presetting the count in the register and the second signal resetting the counter in the register or vice versa so that the count in the register corresponds to the angular position of the manually controlled member from the reference axis, and means responding to the register count for controlling the second control means.

16. In a four wheel steering system for a non-activated vehicle as defined in claim 15, including a data storage device for storing the count in the register, and a microprocessor for periodically retrieving the count from the register after a period of delay and utilizing the developed count as information to control the second control means.

17. In a four wheel steering system for a non-activated vehicle as defined in claim 15, including a sine wave generator, said sine wave generator being phased with the first signal and hence, the scanning crossover at the reference axis, and demodulating means for decreasing the sine wave in response to the register count and developing a control signal for the second control means.

18. In a four wheel steering system for a non-articulated vehicle having a front pair of steerable wheels positioned by a first steering motor to angles $\theta_F$ and a rear pair of steerable wheels positioned by a second steering motor to angles $\theta_R$, a digital control circuit for at least the second steering motor responsive to the angular position of a steering member from a reference axis parallel to the longitudinal axis of the vehicle, comprising: scanning means for repeatedly scanning the position of the steering member with respect to the reference axis and developing once each cycle a first signal at the reference axis and a second signal at the rotated position of the steering member, a digital register, clock means for driving the count in the register, said first signal presenting the count in the register and the second signal resetting the count in the register or vice versa so that the count in the register corresponds to the angular position of the steering member, and means responsive to the register count for controlling the second steering motor.

19. In a four wheel steering system for a non-articulated vehicle as defined in claim 18, including a microprocessor for receiving information corresponding to the register count and in response thereto and to internally programmed algorithms developing rear wheel angle $\theta_R$ information for controlling the second steering motor.

20. In a four wheel steering system for a non-articulated vehicle as defined in claim 19, a data storage device for storing the count in the register, and means for retrieving the count in the data storage device after a predetermined delay period D and developing rear wheel angle drive signals therefrom for the second steering motor so the rear wheel angles $\theta_R$ are delayed from the front wheel angle $\theta_F$ as the wheels turn.

21. A four wheel steering system for a non-articulated vehicle as defined in claim 20, including means for sensing decreasing $\theta_F$ angles after the vehicle has begun turning and thereafter developing rear wheel drive signals for the second steering motor so that the rear wheel angles $\theta_R$ are time phased with and equal to the front wheel angles $\theta_F$.

22. In a four wheel steering system for a non-articulated vehicle having a front pair of steerable wheels positioned by a first steering motor to angles $\theta_F$ and a rear pair of steerable wheels positioned by a second steering motor to angles $\theta_R$, a system for steering the front and rear wheels independently comprising: a manually steerable rotatably mounted steering member, said rotatably mounted member being movable in clockwise and counter-clockwise directions from a neutral position in alignment with a reference axis passing through the member parallel to the longitudinal axis of the vehicle, a conventional mechanical hydraulic interconnection between the steering member and the first steering motor, a control system for controlling the rear wheels through the second steering motor including an annular array of terminals and a rotatable manually controlled member mounted adjacent the annular array of terminals and having a descrete activator angular fixed thereon that serially activates the terminals as the member is rotated, said member being movable in either direction from a neutral position aligned with the reference axis, circuit means for determining which of the terminals is activated and calculating the angle $\theta$ through which the member is rotated, and means responsive to the circuit means for controlling the second control means.

23. In a four wheel steering system for a non-articulated vehicle having a front pair of steerable wheels positioned by a first steering motor to angles $\theta_F$ and a rear pair of steerable wheels positioned by a second steering motor to angles $\theta_R$, a control for the first and second steering motors, comprising: manually operable steering means for controlling said first steering motor to position said front pair of steerable wheels at angles $\theta_F$, means for sensing the angles $\theta_F$ and developing $\theta_F$ information therefrom, control means for controlling the second steering motor in response to $\theta_F$ information to position the rear wheels at angles $\theta_R$, means responsive to the developed $\theta_F$ information for delaying $\theta_F$ information and applying it modified or unmodified as $\theta_R$ information to the rear wheel control means, the means for delaying the $\theta_F$ information and applying it as $\theta_R$ information being operable at the intial movement of the manually operable means from a neutral position, the means for delaying the $\theta_F$ information and applying it as $\theta_R$ information including a memory for storing the $\theta_F$ information, and means for varying the delay by controlling the time of retrieval of the $\theta_F$ information from the memory.

24. In a four-wheel steering system for a non-articulated vehicle as defined in claim 23, wherein the means for delaying the $\theta_F$ information and applying it as $\theta_R$ information includes means for controlling the duration of the delay, said means for controlling the duration of the delay being responsive to a predetermined distance traveled by the vehicle.

25. In a four wheel steering system for a non-articulated vehicle having a front pair of steerable wheels positioned by a first steering motor to angles $\theta_F$ and a rear pair of steering wheels positioned by a second steering motor to angles $\theta_R$, wherein said front wheels travel in front path and said rear wheels travel in a rear path, a control for the first and second steering motors, comprising: first control means for the first steering motor to initiate a turn to begin travel of the front wheels in a curved front path, and second control means for the second steering motor to position the rear wheels so they define a rear path radially inside the front path at the initiation of a turn without turning in the same direction as the front wheels and then a rear path radially outside the front path to provide improved steering response with control, the vehicle having a longitudinal axis defined as a reference axis, said second control means for the second steering motor positioning the rear wheels at an angle $\theta_R=0$ with respect to the reference axis at the initiation of a turn for a predetermined period wherein the predetermined period is determined by movement of the vehicle through a predetermined distance s.

26. In a four wheel steering system for a non-articulated vehicle as defined in claim 25, wherein the distance s is less than the vehicle wheelbase for at least vehicle speeds under 44 ft/sec.

27. In a four wheel steering system for a non-articulated vehicle having a front pair of steerable wheels positioned by a first steering motor to angles $\theta_F$ and a rear pair of steerable wheels positioned by a second steering motor to angles $\theta_R$, wherein the vehicle has a longitudinal axis defined as a reference axis, the combination comprising; control means for the first steering motor to position the front wheels at angles $\theta_F$ with respect to the reference axis, and control means for the second steering motor to position the rear wheels at angles $\theta_R$ with respect to the reference axis, said second control means being responsive to the first control means increasing front wheel angles $\theta_F$ to initiate a turn for maintaining the rear wheels at an angle $\theta_R=0$ for a predetermined period, the period $\theta_R=0$ being determined by an incremental distance traveled by the vehicle and the period is less than the wheelbase W of the vehicle and greater than 0.5 W.

28. In a four wheel steering system for a non-articulated vehicle moving a front pair of steerable wheels positioned by a first steering motor to angles $\theta_F$ and a rear pair of steerable wheels positioned by a second steering motor to angles $\theta_R$, a control for the first and second steering motor, comprising: manually operable steering means for controlling said first steering motor to position said front pair of steerable wheels at angles $\theta_F$, means for sensing the angles $\theta_F$ and developing $\theta_F$ information therefrom, control means for controlling the second steering motor in response to $\theta_F$ information to position the rear wheels at angles $\theta_R$, and means responsive to the developed $\theta_F$ information and applying it modified or unmodified as $\theta_R$ information to the rear wheel control means, said second control means increasing the rear wheel angles $\theta_R$ during initiation of a turn as the front wheel angles $K\theta_F$ increase so that $\theta_R < \theta_F$ during an initial period, said second control means inluding means for sensing a decrease in $\theta_F$ at a time when $\theta_R$ is continuing to increase after the initial period and thereafter controlling the rear wheels so that $\theta_R = \theta_F$, where k is constant.

29. In a four wheel steering system for a non-articulated vehicle as defined in claim 28, wherein the means for delaying the $\theta_F$ information and applying it as $\theta_R$ information is operable at the initial movement of the manually operable means from a neutral position.

30. In a four wheel steering system for a non-articulated vehicle as defined in claim 28, wherein the means for delaying the $\theta_F$ information and applying it as $\theta_R$ information includes a memory for storing the $\theta_F$ information, and means for varying the delay by controlling the time of retrieval of the $\theta_F$ information from the memory.

31. In a four wheel steering system for a non-articulated vehicle as defined in claim 28, wherein the means for delaying the $\theta_F$ information and applying it as $\theta_R$ information includes means for controlling the duration of the delay, said means for controlling the duration of the delay being responsive to a predetermined distance traveled by the vehicle.

32. In a four wheel steering system for a non-articulated vehicle as defined in claim 28, including means for sensing the angles $\theta_F$ and developing $\theta_R$ information therefrom, said second control means including program means for developing a program of $\theta_R$ information for the second control means, said means for sensing a decrease in $\theta_F$ including means for determining when $\theta_F k = \theta_R$ as $\theta_F$ decreases and thereafter controlling the rear wheels so that $\theta_R = k\theta_F$, where k is constant.

33. In a four wheel steering system for a non-articulated vehicle having a front pair of steerable wheels positioned by a first steering motor to angles $\theta_F$ and a rear pair of steerable wheels positioned by a second steering motor to angles $\theta_R$, a digital control circuit for at least the second steering motor responsive to the angular position of a steering member from a reference axis parallel to the longitudinal axis of the vehicle, comprising: scanning means for repeatedly scanning the position of the steering member with respect to the reference axis and developing once each cycle a first signal at the reference axis and a second signal at the rotated position of the steering member, a digital register, clock means for driving the count in the register and the second signal resetting the count in the register or vice versa so that the count in the register corresponds to the angular position of the steering member, means responsive to the register count for controlling the second steering motor, and a microprocessor for receiving information corresponding to the register count and in response thereto and to internally programmed algorithms developing rear wheel angle $\theta_R$ information for controlling the second steering motor.

34. In a four wheel steering system for a nonarticulated vehicle having a front pair of steerable wheels positioned by a first steering motor to angles $\theta_F$ and a rear pair of steerable wheels positioned by a second steering motor to angles $\theta_R$, a digital control circuit for at least the second steering motor responsive to the angular position of a steering member from a reference axis parallel to the longitudinal axis of the vehicle, comprising: scanning means for repeatedly scanning the position of the steering member with respect to the reference axis and developing once each cycle a first signal at the reference axis and a second signal at the rotated position of the steering member, a digital register, clock means for driving the count in the register, said first signal presetting the count in the register and the second signal resetting the count in the register or vice versa so that the count in the register corresponds to the angular position of the steering member, means responsive to the register count for controlling the second steering motor, a data storage device for storing the count in the register, and means for retrieving the count in the data storage device after predetermined delay period D and developing rear wheel angle drive signals therefrom for the second steering motor so the rear wheel angles $\theta_R$ are delayed from the front wheel angles $\theta_F$ as the vehicle turns.

35. In a four wheel steering system for a nonarticulated vehicle as defined in claim 34, means for sensing decreasing $\theta_F$ angles after the vehicle has begun turning and thereafter delaying rear wheel drive signals for the second steering motor so that the rear wheel angles $\theta_R$ are time phased with and equal to the front wheel angles $\theta_F$.

36. In a four wheel steering system for a nonarticulated vehicle having a front pair of steerable wheels positioned by a first steering motor to angles $\theta_F$ and a rear pair of steerable wheels positioned by a second steering motor to angles $\theta_R$, a control for the first and second steering motors comprising: manually operable steering means for controlling said first steering motor to position said front pair of steerable wheels at angles $\theta_F$, means for sensing the angles $\theta_F$ and developing $\theta_F$ information therefrom, control means for controlling the second steering motor in response to the $\theta_F$ information to position the rear wheels at angles $\theta_R$, and means responsive to the developed $\theta_F$ information for delaying the $\theta_F$ information where the delay is proportional to vehicle travel distance and applying it modified or unmodified as $\theta_R$ information to the rear wheel control means so that rear wheel swing-out is prevented to avoid adjacent obstacles.

37. In a four wheel steering system for a nonarticulated vehicle having a front pair of steerable wheels positioned by a first steering motor to angles $\theta_F$ and a rear pair of steerable wheels positioned by a second steering motor to angles $\theta_R$, a control for the first and second steering motors, comprising: manually operable steering means for controlling said first steering motor to position said front pair of steerable wheels at angles $\theta_F$, means for sensing the angles $\theta_F$ and developing $\theta_F$ information therefrom, control means for controlling the second steering motor in response to the $\theta_F$ information to position the rear wheels at angles $\theta_R$, means responsive to the developed $\theta_F$ information for delaying the $\theta_F$ information and applying it modified or unmodified as $\theta_R$ information to the rear wheel control means, and means for varying the delay in applying the $\theta_F$ information modified or unmodified as $\theta_R$ information to the rear wheel control means.

38. In a four wheel steering system for a nonarticulated vehicle having a front pair of steerable wheels positioned by a first steering motor to angles $\theta_F$ and a rear pair of steering wheels positioned by a second steering motor to angles $\theta_R$, wherein said front wheels travel in front path and said rear wheels travel in a rear path, a control for the first and second steering motors, comprising: first control means for the first steering motor to initiate a turn to begin travel of the front wheels in a curved front path, second control means for the second steering motor to position the rear wheels so they define a rear path radially inside the front path at the initiation of a turn without turning in the same direction as the front wheels and then a rear path radially outside the front path to provide improved steering response with control, said second control means delaying the initiation of the second steering motor for a period after the initiation of turning of the front wheels, and means for varying the delay of the second control means to vary total steering sensitivity in different speed ranges of the vehicle.

* * * * *